United States Patent [19]

Freiwald

[11] Patent Number: 5,368,397
[45] Date of Patent: Nov. 29, 1994

[54] GUIDE BUSHING WITH AN INTEGRATED SEAL FOR THE CLUTCH-RELEASE BEARING OF A GEAR UNIT

[75] Inventor: Gerhard Freiwald, Hemsbach, Germany

[73] Assignee: Firma Carl Freudenberg, Weinheim, Germany

[21] Appl. No.: 96,079

[22] Filed: Jul. 22, 1993

[30] Foreign Application Priority Data

Jul. 22, 1992 [DE] Germany .............. 4224179

[51] Int. Cl.⁵ .............. F16C 33/76; F16D 23/14
[52] U.S. Cl. .............. 384/130; 192/98; 384/486
[58] Field of Search .............. 384/607, 609, 612, 477, 384/486; 192/98, 110 B, 115

[56] References Cited

U.S. PATENT DOCUMENTS

| | | | |
|---|---|---|---|
| 4,054,336 | 10/1977 | Ernst et al. | 384/609 |
| 4,911,277 | 3/1990 | Parzefall | 192/110 B X |
| 4,960,193 | 10/1990 | Hodge | 192/98 X |

FOREIGN PATENT DOCUMENTS

| | | |
|---|---|---|
| 301965 | 7/1988 | European Pat. Off. |
| 336843 | 10/1989 | European Pat. Off. ........ 192/110 B |
| 4040990 | 6/1991 | Germany .............. 192/98 |

Primary Examiner—Thomas R. Hannon
Attorney, Agent, or Firm—Kenyon & Kenyon

[57] ABSTRACT

A guide bushing having an integrated seal for the clutch-release bearing of a gear unit, comprising a connecting sleeve [pipe socket] circumferentially surrounding an input shaft of the gear unit with radial clearance and a mounting flange affixed to the connecting sleeve, whereby, on the side facing the outer wall of the gear unit, the connecting sleeve has an essentially Z-shaped cross-section, whereby the Z-shaped cross-section is comprised of a first axial side piece situated radially to the inside and of a second axial side piece situated radially to the outside, and whereby the first and the second axial side piece are joined by a radial side piece. The seal has a Z-shaped profile that is adapted to the connecting sleeve, whereby the seal is provided on the side facing the input shaft to be sealed off with at least one dynamically stressed sealing lip and, on the side facing the outer wall of the gear unit, with at least one statically stressed second sealing lip, which projects axially in the direction of the outer wall and is able to be forced into sealing engagement with this outer wall. The first and the second sealing lip, while integrally formed to blend into one another, are affixed to a reinforcement ring made of a non-creeping material, whereby the reinforcement ring is retained with radial prestressing in the first axial side piece.

9 Claims, 2 Drawing Sheets

GUIDE BUSHING WITH AN INTEGRATED SEAL FOR THE CLUTCH-RELEASE BEARING OF A GEAR UNIT

BACKGROUND OF THE INVENTION

1. Field of the Invention

The present invention relates to a guide bushing with an integrated seal which is used in the clutch-release bearing of a gear unit. The guide bushing has a connecting sleeve circumferentially surrounding, with a radial clearance, an input shaft of the gear unit and also has a mounting flange affixed to the connecting sleeve. On the side of the guide bushing which faces the outer wall of the gear unit, the connecting sleeve has an essentially Z-shaped cross-section. The Z-shaped cross-section is comprised of a first axial side piece situated radially inwardly and a second axial side piece situated radially outwardly. The first and second axial side pieces are joined by a radial side piece. The bushing also includes a seal with a dynamically stressed sealing lip sealing against the shaft and at least one statically stressed sealing lip seal sealing against the outer wall of the gear unit.

2. Description of the Related Art

EPO Patent 301,965 discloses a guide bushing. The guide bushing described in that patent is for the clutch-release bearing of a motor vehicle gear unit, and contains a mounting flange for attaching the guide bushing to the outer surface of a gear unit housing wall. The mounting flange shown in that patent is arranged in the same radial plane as a section which accommodates the sealing ring. In the device shown in EPO Patent 301,965, the sealing ring is mounted on a section that extends in the radial direction; this mounting arrangement can promote relaxation in the elastomeric material of the seal. Relaxation can lead to leakage in the area of the dynamic sealing action.

SUMMARY OF THE INVENTION

The object of the present invention is to bring about improved dynamic sealing of an input shaft by more stably retaining the seal inside a connecting sleeve and also to statically seal off the outer wall of the gear unit. It is a further object of the present invention to provide a seal which remains effective over a long service life.

In the present invention, the seal has a Z-shaped profile that is adapted to fit in the connecting sleeve. The seal is provided, on the side facing the input shaft, with at least one dynamically stressed sealing lip. Furthermore, on the side facing the outer wall of the gear unit, the seal includes at least one statically stressed second sealing lip, which projects axially in the direction of the outer wall and is forced into sealing engagement with the outer wall. The first and second sealing lips are integrally formed and are affixed to a reinforcement ring made of a non-creeping material such as metal. The reinforcement ring is retained with radial prestressing in a first axial side piece of the connecting sleeve, preferably also made of a metallic material. The profile of the seal is adapted to conform to a Z-shaped profile of the connecting sleeve. A stable, spatial association results between the sealing lips and the surfaces to be sealed off. Furthermore, it is advantageous, in cases where the input shaft to be sealed off deflects radially, that the seal on the reinforcement ring is only subjected to pressure. This refinement of the seal and its configuration inside the connecting sleeve make it possible to reliably avoid shearing and tensile stresses in the seal, which can reduce service life, particularly in the area where the reinforcement ring is located. The compact construction of the seal and the relatively rigid connection of the first and second sealing lips to the reinforcement ring guarantee exact positioning of the seal relative to the surfaces to be sealed off.

During normal operation, the reinforcement ring can sealingly contact the radial side piece with axial prestressing. This axial prestressing is produced when the statically stressed second sealing lip is elastically deformed as the guide bushing is installed on the end plate of the gear unit. Therefore, the reinforcement ring, which is mounted on the side of the second sealing lip opposite the end wall, is positioned against the radial side piece of the clutch guide bushing.

Precise location of the seal within the connecting sleeve can be achieved, because the reinforcement ring and the connecting sleeve directly abut one another. It is also possible to have a design in which the reinforcement ring is completely surrounded on the side facing the radial side piece of the connecting sleeve, in at least part of its radial extent, by a portion of the sealing material of the second sealing lip.

With respect to protecting the second sealing lip to the greatest possible extent from external mechanical influences, the second sealing lip can be at least partially, or preferably completely, covered by the second axial side piece during normal operation, so that the end face of the second axial side piece abuts closely against the outer wall of the gear unit. The second axial side piece protects the second sealing lip from external influences and also protects the second sealing lip from being subjected to excessive pressure in the axial direction. The assembly of the guide bushing is considerably simplified, because it can be screwed onto the outer wall of the gear unit until the second axial side piece abuts against the outer wall of the gear unit. The second sealing lip, which prior to assembly projects in the axial direction over the end face of the second axial side piece, then contacts the outer wall of the gear unit with a precisely predetermined axial contact pressure.

In one advantageous embodiment, the connecting sleeve and the mounting flange can be formed in one piece. Besides facilitating production because fewer parts need to be installed, this also simplifies the assembly operation.

Improved static sealing action can be achieved when the second sealing lip, together with a radially adjacent additional sealing lip, define a gap that is filled with grease.

Stable and exact location of the seal within the connecting sleeve can be achieved if the ratio between the axial expansion of the seal and the radial expansion is between 1:1 and 1:0.25. With this refinement, there is no need to fear manifestations of canting when the input shaft is displaced. Because any radial expansion is, at most, as great as the axial expansion of the seal, long guidance of the dynamically stressed first sealing lip results inside the first axial side piece. As a result, tolerances of the connecting sleeve that are dependent on manufacturing do not have any negative effect on the working properties of the guide bushing. It is therefore not necessary for the first axial side piece to De made with substantial dimensional accuracy in relation to the radial side piece; the guide bushing therefore can be produced more simply and economically.

The dynamically stressed first sealing lip can be bounded by intersecting conical surfaces, whereby the conical surface arranged on the side facing the medium to be sealed off forms a larger angle with the surface of the input shaft than the conical surface on the axially opposing side. This refinement produces a recirculating effect for the fluid medium in the direction of the space to be sealed off and also causes the lubricating film between the first sealing lip and the shaft to be constantly renewed because of constant circulation of the lubricant. On the side facing away from the space to be sealed off, a protective sealing lip can be provided in addition to the dynamically stressed first sealing lip. This protective sealing lip prevents the first sealing lip from being subjected to pollutant particles which could reduce service life.

To have exact location of the dynamically stressed first sealing lip in a particular position between the connecting sleeve and the shaft to be sealed off, the radial clearance between the input shaft and the connecting sleeve should be 0.25 to 1.0 times as great as the axial expansion of the reinforcement ring on the side opposite the first axial side piece. A small radial clearance between the input shaft and the connecting sleeve produces an inherently stable seal, even with displacements of the input shaft in the axial direction caused, for example, by thermal expansion. The spatial location of the dynamically stressed first sealing lip does not change in relation to the surface of the shaft to be sealed off, so that seal properties always remain constant, and an invariable recirculating effect results during normal operation.

BRIEF DESCRIPTION OF THE DRAWINGS

The guide bushing according to the present invention is described in greater detail in reference to an exemplified embodiment; individual components to be considered are illustrated, partially in a schematic representation.

DESCRIPTION OF THE PREFERRED EMBODIMENTS

Figure 1:
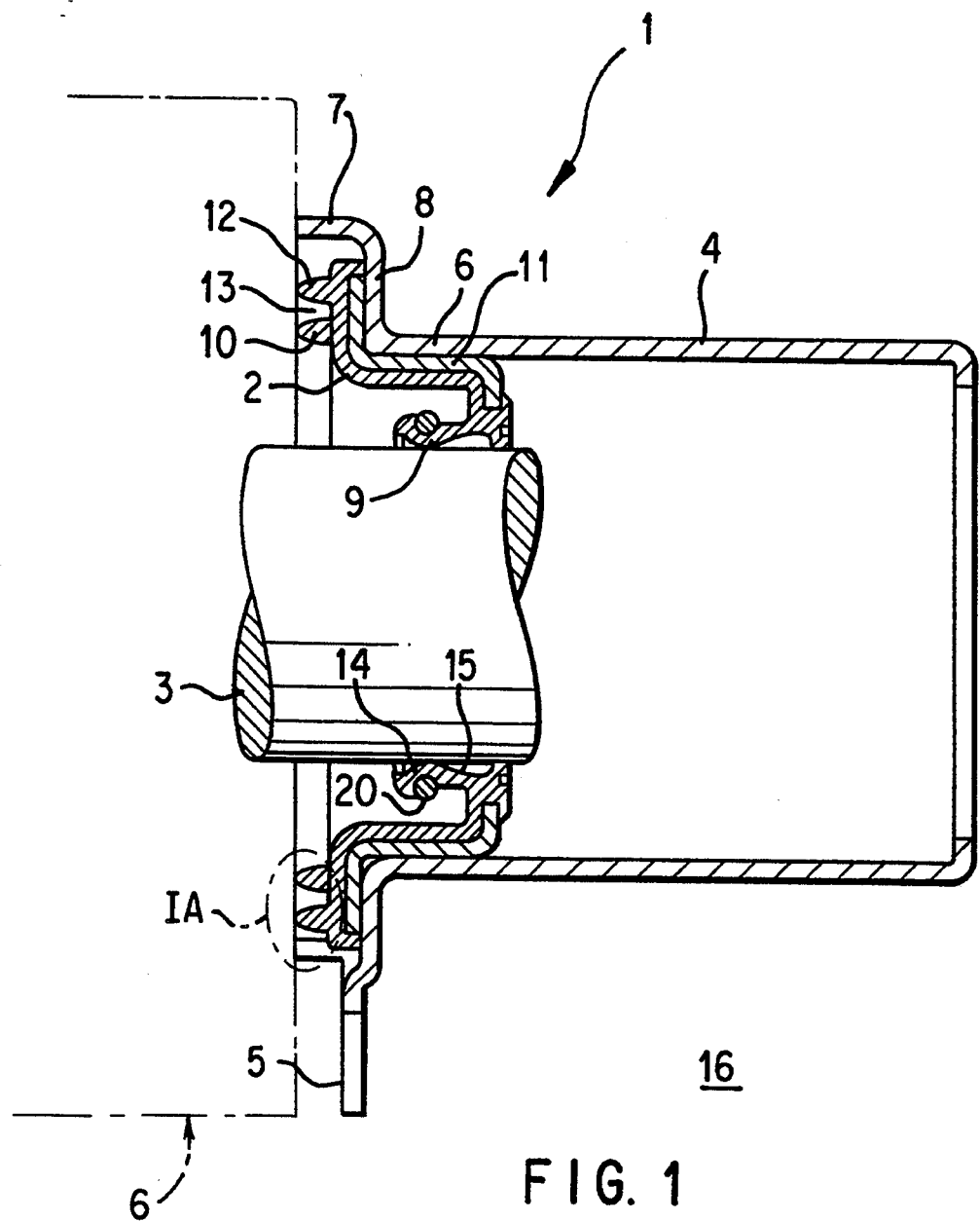
FIG. 1 shows an exemplified embodiment of the guide bushing of the present invention in a cross-sectional representation.
Figure 1A:
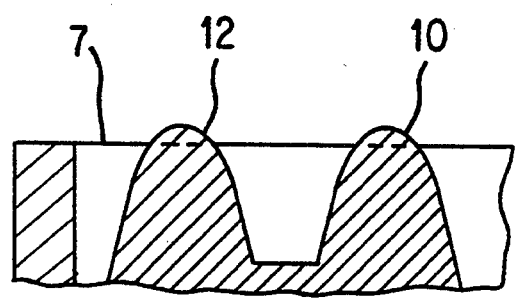
FIG. 1a shows detail 1A in FIG. 1, wherein the lips 10, 12 are in an unstressed condition before assembly onto a gear unit.

FIG. 1 depicts a guide bushing 1 having an integrated seal 2, which finds application in a clutch-release bearing for a gear unit, for example in motor vehicles. The guide bushing 1 comprises a connecting sleeve 4, which circumferentially surrounds an input shaft 3 of the gear unit with radial clearance. The gear unit is flange-mounted on the guide bushing 1 opposite the side 16 facing the medium to be sealed off. The connecting sleeve 4 and the mounting flange 5 are integrally formed to blend into one another in one piece and are made, in this exemplified embodiment, of deep-drawn sheet metal. The connecting sleeve 4 comprises a first axial side piece 6 situated radially inwardly and a second axial side piece 7 situated radially outwardly. The axial side pieces 6,7 are joined by a radial side piece 8. The first axial side piece 6 situated radially inwardly surrounds the reinforcement ring 11 with radial prestressing so that, in the area of its axial and radial extent, the reinforcement ring 11 abuts on the connecting sleeve 4. The seal 2 is retained by a frictional connection between the reinforcement ring 11 and the first axial side piece 6. In the exemplified embodiment, the seal 2 comprises a dynamically stressed first sealing lip 9, which dynamically seals off the input shaft 3. The dynamically stressed first sealing lip 9 is dynamically stressed via an annular helical spring 20, which seals off the shaft with radial preloading. The spring 20 prevents manifestations of relaxation in the elastomeric material of the sealing lip 9. Two statically stressed sealing lips 10, 12 are arranged on the side facing the outer wall of the gear unit. These sealing lips 10, 12 are adjacent to one another with a radial clearance, forming a gap 13. The gap 13 between the second sealing lip 10 and the additional sealing lip 12 formed by the radial clearance may be filled with grease.

It is simple to manufacture the disclosed guide bushing 1, because it consists of only two parts which must be affixed to one another. In the area of the first axial side piece 6, the connecting sleeve 4, together with the integrally formed mounting flange 5, constitute the mounting seat for the flange 2. The first sealing lip 9 and the second sealing lip 10 are integrally formed and affixed to a reinforcement ring 11. The advantageous geometric dimensions of the seal 2, whose ratio of axial expansion to radial expansion is between 1:1 and 1:0.25, preferably 1:0.75 to 1:0.5, result in an exact and constant location of the individual parts of the guide bushing 1 relative to one another during normal operational use. Tolerances of the connecting sleeve 4, which may vary due to manufacturing conditions, do not adversely affect the working properties of the guide bushing. The second axial side piece 7 completely covers the statically stressed second sealing lip when the gear unit is mounted, thereby avoiding any mechanical damage to the second sealing lip 10. To limit the elastic deformation that the second sealing lip 10 is subject to when it is mounted on the outer wall of the gear unit, the configuration of the second axial side piece 7 is such that it is positioned against the outer wall of the gear unit, given a previously determined elastic prestressing of the second sealing lip 10. A still greater deformation, in an excessive straining of the second sealing lip 10, is thus prevented.

In this exemplified embodiment, the axial expansion of the seal 2 is twice as great as the radial expansion.

Figure 2:
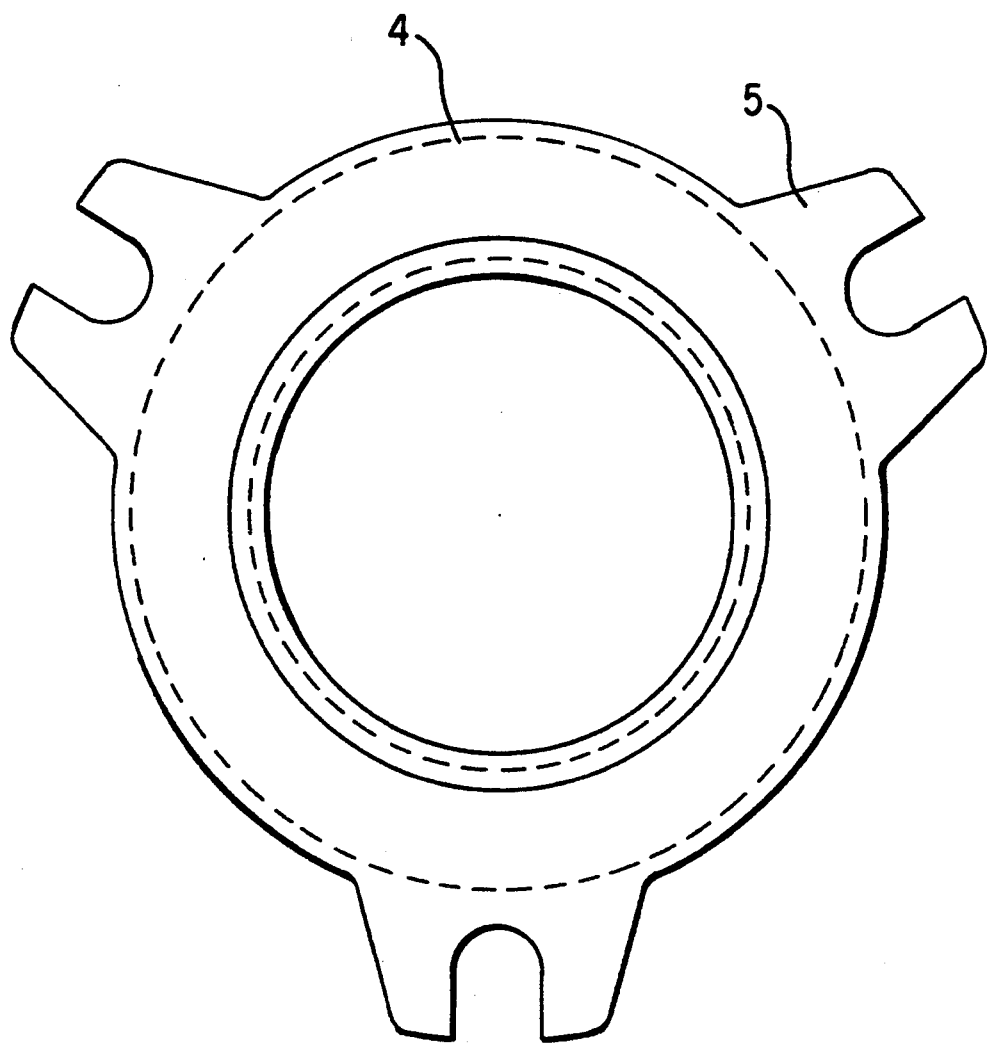
FIG. 2 depicts a bottom view of the connecting sleeve of FIG. 1.

FIG. 2 depicts the connecting sleeve 4 of the guide bushing I as a component part, which is formed in one piece with the mounting flange 4. The mounting flange 5 has three cut-outs, which are uniformly distributed in the circumferential direction and allow it to be secured to the outer wall of the gear-unit housing.

I claim:

1. A guide bushing for guiding a shaft comprising:
   (i) a connecting sleeve circumferentially surrounding said shaft with radial clearance, said connecting sleeve comprising:
      (i) a mounting flange,
      (ii) a first axial side piece situated radially inwardly,
      (iii) a second axial side piece situated radially outwardly, and
      (iv) a radial side piece connecting said first and second axial side pieces;
   (b) a seal with a profile that conforms to the connecting sleeve, said seal comprising:
      (i) at least one first sealing lip on a portion of the seal facing the input shaft, and (ii) at least one axially extending second sealing lip;

(c) a reinforcement ring, said seal being affixed to said reinforcement ring, said reinforcement ring being retained with radial prestress in the first axial side piece.

2. The guide bushing of claim 1, wherein: the reinforcement ring sealingly contacts the radial side piece with axial prestress.

3. The guide bushing of claim 1, wherein: the reinforcement ring and the connecting sleeve directly abut one another.

4. The guide bushing of claim 1, wherein: the second sealing lip is completely covered by the second axial side piece during normal operational use.

5. The guide bushing of claim 1, wherein: the connecting sleeve is formed in one piece.

6. The guide bushing according to claim 1, wherein: said seal further comprises an additional second sealing lip, the second sealing lip and the additional second sealing lip defining a circumferential gap, said gap being filled with grease.

7. The guide bushing according to claims 1, wherein: the ratio between axial expansion of the seal and radial expansion is between 1:1 to 1:0.25.

8. The guide bushing according to claim 1, wherein: the first sealing lip is defined by intersecting conical surfaces, the conical surface on a side facing a fluid medium to be sealed off forming a larger angle with an outer surface of the input shaft than the other conical surface.

9. The guide bushing according to claim 1, wherein: the radial clearance between the input shaft and the connecting sleeve is 0.25 to 1.0 times as great as the axial expansion of the reinforcement ring on the side opposing the first axial side piece.

* * * * *

UNITED STATES PATENT AND TRADEMARK OFFICE
CERTIFICATE OF CORRECTION

PATENT NO. : 5,368,397
DATED : Nov. 29, 1994
INVENTOR(S) : FREIWALD

It is certified that error appears in the above-indentified patent and that said Letters Patent is hereby corrected as shown below:

Column 2, line 65, "De" should be --be--;

Column 3, line 56, after "unit" insert --G--;

Column 4, line 43, "in" should be --i.e.,--;

Column 4, line 49, "I" should be --1--; and

Column 4, line 56, "(i)" should be --(a)--.

Signed and Sealed this

Sixth Day of June, 1995

Attest:

BRUCE LEHMAN

Attesting Officer

Commissioner of Patents and Trademarks